United States Patent [19]

Kouda

[11] 4,186,652
[45] Feb. 5, 1980

[54] SERVO VALVE FOR POWER STEERING BOOSTER

[75] Inventor: Masanori Kouda, Atsugi, Japan

[73] Assignee: Atsugi Motor Parts Co., Ltd., Atsugi, Japan

[21] Appl. No.: 864,806

[22] Filed: Dec. 27, 1977

[30] Foreign Application Priority Data

Dec. 28, 1976 [JP] Japan ............................. 51/159156

[51] Int. Cl.² ............................................. F15B 13/14
[52] U.S. Cl. ......................................... 91/434; 91/370; 137/625.69
[58] Field of Search ................. 91/434, 370, 372, 373; 137/625.69

[56] References Cited

U.S. PATENT DOCUMENTS

| 2,824,550 | 2/1958 | Gribler et al. ................... 91/434 X |
| 2,934,089 | 4/1960 | Mayers ............................. 91/434 X |
| 2,985,146 | 5/1961 | Randol .............................. 91/434 X |
| 3,352,210 | 11/1967 | Lucien ................................ 91/434 |
| 3,444,786 | 5/1969 | Forster et al. ................... 91/434 |

*Primary Examiner*—Irwin C. Cohen
*Attorney, Agent, or Firm*—Fleit & Jacobson

[57] ABSTRACT

A servo valve for a power steering booster comprises a power piston and cylinder assembly including a power piston reciprocatively movable therewithin and a spool assembly including a hollow spool for controlling selective supply and discharge of hydraulic pressures onto and from both sides of the power piston, a pair of reaction pistons slidably fitted within ends of the hollow spool to form a reaction hydraulic chamber therewithin, a reaction spring interposed between the reaction pistons, cover plates closing the ends of the hollow spool, through which a steering input transmission shaft passes, and reaction support pins of bearing rollers made with a high dimensional accuracy held in guide holes formed in the cover plates between the respective reaction pistons and partitions located at ends of a housing slidably accommodating the spool assembly and having ports for the selective supply and discharge of hydraulic pressures, thereby eliminating the high accuracy machining of parts associated with the spool to achieve the precise neutral position of the spool.

2 Claims, 2 Drawing Figures

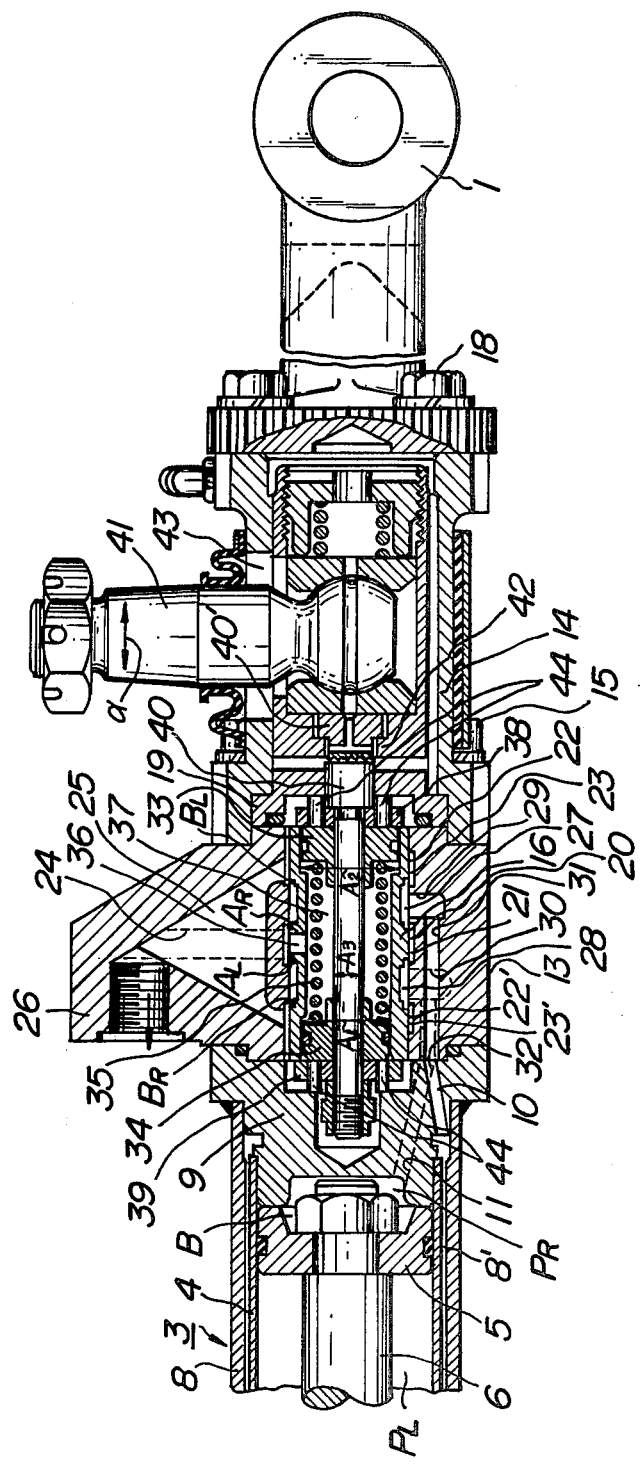

SERVO VALVE FOR POWER STEERING BOOSTER

BACKGROUND OF THE INVENTION

1. Field of the Invention

The present invention relates to a servo valve for power steering boosters.

2. Description of the Prior Art

In incorporating a hydraulic power steering mechanism into a steering system of a vehicle, particularly an automobile, it is desired for the steering mechanism to be as small as possible because the space to be occupied thereby is generally limited. On the other hand, in order to obtain a proper steering feeling for an operator, it is required to apply hydraulic pressure and/or spring reaction to the steering system. For this purpose, in the prior art, springs have been located at ends of a spool of a servo valve for such kinds of the boosters against the axial displacement of the spool. With this arrangement, there has been a tendency of the servo valve to be unduly elongated.

With another servo valve hitherto used, a spool of the valve is formed hollow within which are located a pair of reaction pistons and a single spring. However, it has been difficult, if not impossible, for reaction supporting parts of this valve to be machined with a desired dimensional accuracy in their length.

SUMMARY OF THE INVENTION

The object of the present invention is to provide an improved servo valve for power steering boosters which eliminates the disadvantages of the prior art above described, successfully fulfils the requirement of the miniaturization of the servo valve for power steering boosters and meets the requirement of machining accuracy desired to provide the precise neutral position of the servo valve in a simple manner with ease.

The servo valve for power steering boosters according to the present invention comprises a power piston and cylinder assembly and a spool assembly, said power piston and cylinder assembly comprising a hydraulic cylinder, a reciprocatively movable piston rod and a power piston integrally clamped thereto and slidably movable within said hydraulic cylinder, said spool assembly comprising a hollow spool for controlling selective supply and discharge of pumped hydraulic pressures onto and from both sides of said power piston, a pair of reaction pistons having different pressure receiving areas corresponding to those on both sides of said power piston and slidably fitted within ends of said hollow spool to form a reaction hydraulic chamber therewithin, a reaction spring interposed between said reaction pistons against which said reaction pistons slidably move within said spool, and cover plates closing the ends of said hollow spool between which a steering input transmission shaft passes through said reaction pistons, said spool assembly further comprising reaction support pins respectively held in guide holes formed in said cover plates between said respective reaction pistons and partitions located at ends of a housing slidably accommodating said spool assembly and including ports for said selective supply and discharge of hydraulic pressures.

In order that the invention may be more clearly understood, a preferred embodiment will now be described, by way of example, with reference to the accompanying drawings.

BRIEF DESCRIPTION OF THE DRAWINGS

FIG. 1a is a longitudinal sectional view of a right hand main part of an exemplary power steering booster assembly to which is applied the servo valve according to the invention, of which left part has been broken away for the space of the drawing; and FIG. 1b is a longitudinal sectional view of a left hand remaining part of the booster as shown in FIG. 1a.

DETAILED DESCRIPTION OF THE PREFERRED EMBODIMENT

Figure 1B:
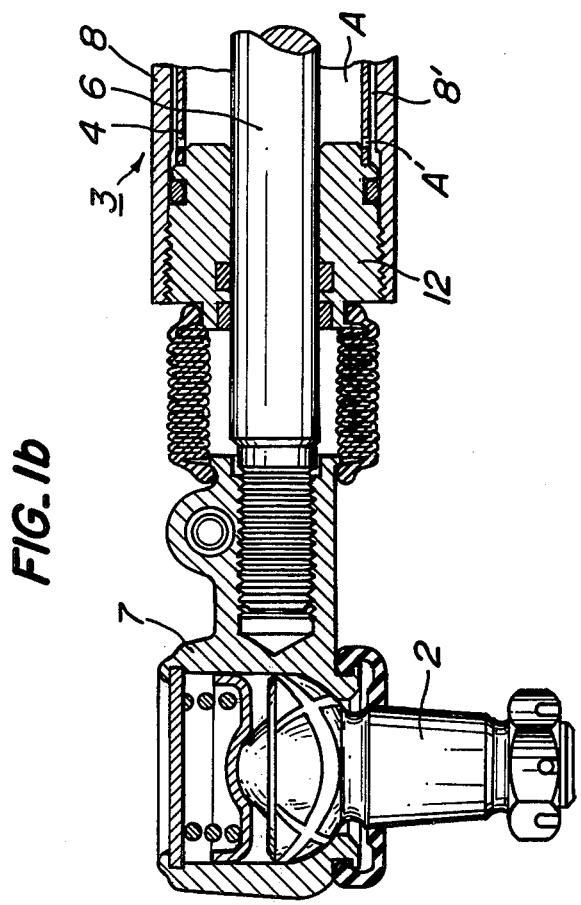

FIG. 1 exemplarily illustrates a power steering booster assembly to which is applied a servo valve according to the present invention. The booster assembly includes at its one end an eye member 1 connected to a steering mechanism for wheels through an idler arm or link and a drag link (both not shown) and at the other end a stud 2 fixed to a chassis (not shown). Between these members there are provided a hydraulic cylinder 4 and a power piston 5 and a piston rod 6 therein to form a booster 3 as an extensible and retractable mechanism.

The piston rod 6 is reciprocatively movable within the hydraulic cylinder 4 on its rod end and is provided on its extended end with a socket 7 for pivotally securing the stud 2. To the inner end of the piston rod is clamped the power piston 5 by means of a nut, whose pressure receiving areas on both sides are different. When applying onto the rod and head sides of the power piston 5 the different hydraulic pressures $P_L$ and $P_R$ inversely proportional to the areas of the piston on its rod and head sides, the steering forces will become equal to each other in steering the wheels in left and right directions.

The booster 3 comprises a sleeve 8 protectively surrounding the hydraulic cylinder 4 to form therebetween a liquid passage 8' communicating through openings A' with an operating pressure chamber A around the piston rod 6 and further directly communicating with an aperture 10 formed in a partition 9 fixed to the hydraulic cylinder 4 and sleeve 8. On the other hand, the operating pressure chamber B on the head end of the power piston 5 is directly communicated with an aperture 11 formed in the partition 9. A rod guide 12 is threadedly fitted within the outer end of the sleeve 8 fixed to the partition 9 by welding on its outer periphery for holding the hydraulic cylinder 4 concentric to the partition 9.

A housing 13 as a servo valve body is integrally clamped between the partition 9 and a steering input device body 14 by means of bolts 15 and incorporates therein a hollow spool 16. On the opposite end of the steering input device body 14 is fixed the eye member 1 by means of bolts 18 in alignment with the booster 3. An inner partition 19 is arranged between the housing 13 and the body 14.

The housing 13 is formed with an inlet port 21 facing to a central land 20 of the hollow spool 16 and outlet ports 23, 23' facing to a pair of end lands 22, 22' and is provided with a piping receiver 26 including an inlet passage 24 and an outlet passage 25 for connecting the inlet port 21 to a pump (not shown) and the outlet ports 23, 23' to a reservoir (not shown). The housing 13 is further provided with liquid guide openings 29 and 30 connecting respectively to a pair of spool grooves 27 and 28 on both sides of the central land 20 of the hollow spool 16 and lateral apertures 31 and 32 respectively communicating the liquid guide openings 29 and 30 with the apertures 10 and 11 in the partition 9. The ports 21, 23 and 23' formed in the housing 13 and the grooves 27 and 28 formed in the hollow spool 16 form underlapped or overlapped portions in the order of 0.1 to 0.5 mm in the form of throttles which serve as throttle valves when the hollow spool 16 moved relative to the housing 13.

The hollow spool 16 includes at its ends a pair of reaction pistons 33 and 34 relatively slidably fitted therein and having different diameters corresponding to the pressure receiving area ratio of both sides of the power piston, and between the reaction pistons 33 and 34 a reaction spring 35. The hollow spool 16 is formed in the central land 20 with the through aperture 36 to form a reaction hydraulic chamber 37 between the reaction pistons 33 and 34. The reaction pistons 33 and 34 are gathered together with a steering input transmission shaft 40 passing therethrough between cover plates 38 and 39 closing the ends of the hollow spool in contact with the reaction pistons 33 and 34.

The transmission shaft 40 serves to combine the hollow spool 16 and the other elements to form an assembly as a single operative element by means of a shoulder engaging the cover plate 38 and a nut anchoring the cover plate 39 at the end of the transmission shaft extending beyond the hollow spool 16. The transmission shaft 40 is anchored to a ball joint socket 42 of an input stud 41 at a flange 40' at the end of the transmission shaft 40 passing through the inner partition 19 in a liquid-tight manner. The socket 42 is axially slidably incoroorated in the steering input device body 14 whose wall is formed with an elongated slot 43 from which extends the stud 41. The stud 41 moves rectilinearly as shown in an arrow $\alpha$ geared with a steering rotation of a steering handle through a connecting rod (not shown)

According to the present invention, the neutral position of the hollow spool 16 as shown is precisely maintained and the respective distances of the reaction pistons 33 and 34 to the inner partition 19 and the partition 9 are uniformly maintained to cause reactions for bringing a proper steering feeling by the use of bearing rollers therebetween having a particularly high dimensional accuracy in length as reaction support pins 44 held within guide holes in the cover plates 38 and 39.

When an operating force is applied to the stud 41 in the right direction as viewed in FIG. 1, the hollow spool 16 is pulled to the same direction by the transmission shaft 40 and the reaction spring 35 is then compressed by the reaction piston 34 moved together with the hollow spool 16 because of the other reaction piston 33 supported by the inner partition 19 through reaction support pins 44, so that the hydraulic pressure in the reaction hydraulic chamber 37 is increased to a value corresponding to the resistance between the wheels and the ground or road and in conjunction with the movement of the hollow spool 16 relative to the housing 13 the throttles $A_R$ and $B_R$ of the ports 21 and 22' of the housing 13 are closed and the throttle $A_L$ is simultaneously opened to flow the hydraulic pressure $P_R$ through the spool groove 28, liquid guide opening 30 lateral aperture 32 and aperture 11 to the power piston 5 of the booster 3, causing it to move to the left direction. On the other hand, the hydraulic pressure $P_L$ on the rod side of the power piston 5 is drained through the openings A', liquid passage 8', aperture 10, liquid guide opening 29 and spool groove 27 and via the throttle $B_L$ to the outlet passage 25.

It is also understood that the hydraulic pressure $P_R$ acts upon the reaction piston 33 in the reaction hydraulic chamber 37. The hydraulic reaction in this case is indicated by $(A_2-A_3) \cdot P_R$, where $A_2$ and $A_3$ are respective cross-sectional areas of the reaction piston 33 and transmission shaft 40. This hydraulic reaction provides a steering feeling corresponding to the resistance between the wheels and the ground or road.

When an operating force is applied to the stud 41 in the left direction as viewed in FIG. 1, the hollow spool 16 is pushed by the transmission shaft 40 and the reaction spring 35 is then compressed by the reaction piston 33 moved together with the hollow spool 16 because of the reaction piston 34 supported by the partition 9 through the reaction support pins 44, so that the passages are opened in the opposite flow direction to those above described with respect to the operation in the right direction, causing the power piston 5 of the booster 3 to move to the right direction. In this case, the hydraulic reaction is $(A_1-A_3) \cdot P_L$, where $A_1$ is a cross-sectional area of the reaction piston 34. This hydraulic reaction provides a steering feeling corresponding to the present resistance between the wheels and ground or road.

It should be understood that the pressure receiving areas $A_1$ and $A_2$ of the reaction pistons 34 and 33 are of course proportional to those of the power piston 5 of the booster 3 to render equal the steering reactions in left and right steering directions because the hydraulic pressure $P_L$ would otherwise be more than that $P_R$ under the same resistance between wheels and ground or road due to the different pressure receiving areas on both sides of the power piston 5 of the booster 3.

In any cases, after the operation of the booster 3 the sleeve 13 is returned to the neutral position relative to the hollow spool 16, the underlapped or overlapped relation between the grooves of the hollow spool 16 and the ports of the housing 13 is restored to permit the inlet passage 24 to connect to the outlet passage 25 to lower the hydraulic pressure.

With the arrangement, the displacement of the hollow spool must be as small as possible in order to obtain the rapid ersponsibility of the power steering mechanism. For this purpose, the underlapped or overlapped amounts at the throttles $A_R$, $A_L$, $B_R$ and $B_L$ must be as small as possible, and therefore, the parts associated with the spool must be machined with very high accuracy to achieve the precise neutral position of the hollow spool. To overcome this problem according to the present invention the reaction pistons causing the steering reaction are supported by the bearing rollers which are very dimensionally precise in length, thereby eliminating the high accuracy working of the reaction support members without adversely affecting the desired performance of the servo valve.

Although there has been shown and described a specific structure, it is to be clearly understood that the same were merely for the purpose of illustration, and that changes and modifications may readily be made therein by those skilled in the art without departing from the spirit and scope of the invention.

What is claimed is:

1. A servo valve in combination with a power steering booster comprising a power piston and cylinder assembly and a spool assembly, said power piston and cylinder assembly comprising a hydraulic cylinder, a reciprocatively movable piston rod and a power piston integrally clamped thereto and slidably movable within said hydraulic cylinder, said spool assembly comprising a hollow spool for controlling selective supply and discharge of pumped hydraulic pressures onto and from both sides of said power piston, a pair of reaction pistons having different pressure receiving areas corresponding to those on both sides of said power piston and slidably fitted within ends of said hollow spool to form a reaction hydraulic chamber therebetween, a reaction spring interposed between said reaction pistons against which said reaction pistons slidably move within said spool and having a steering input transmission shaft passing through said reaction pistons, and cover plates being retained by the ends of said steering input transmission shaft for closing the ends of said hollow spool, said spool assembly further comprising reaction support pins respectively held in guide holes formed in said cover plates between said respective reaction pistons and partitions located at ends of a housing forming the servo valve body, said housing slidably accommodating said spool assembly and including ports for said selective supply and discharge of hydraulic pressures.

2. A servo valve as set forth in claim 1, wherein each said reaction support pin consists of a bearing roller made with a high dimensional accuracy.

* * * * *